C. A. CHOATE.
MACHINE FOR HARVESTING FLAX.
APPLICATION FILED DEC. 9, 1920.
1,431,372.
Patented Oct. 10, 1922.
2 SHEETS—SHEET 1.
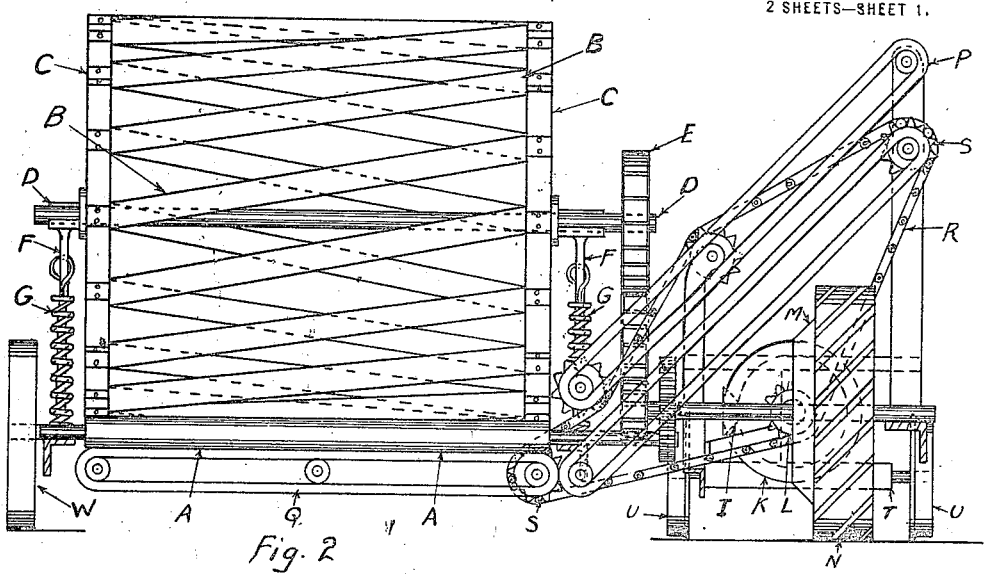
Fig. 2
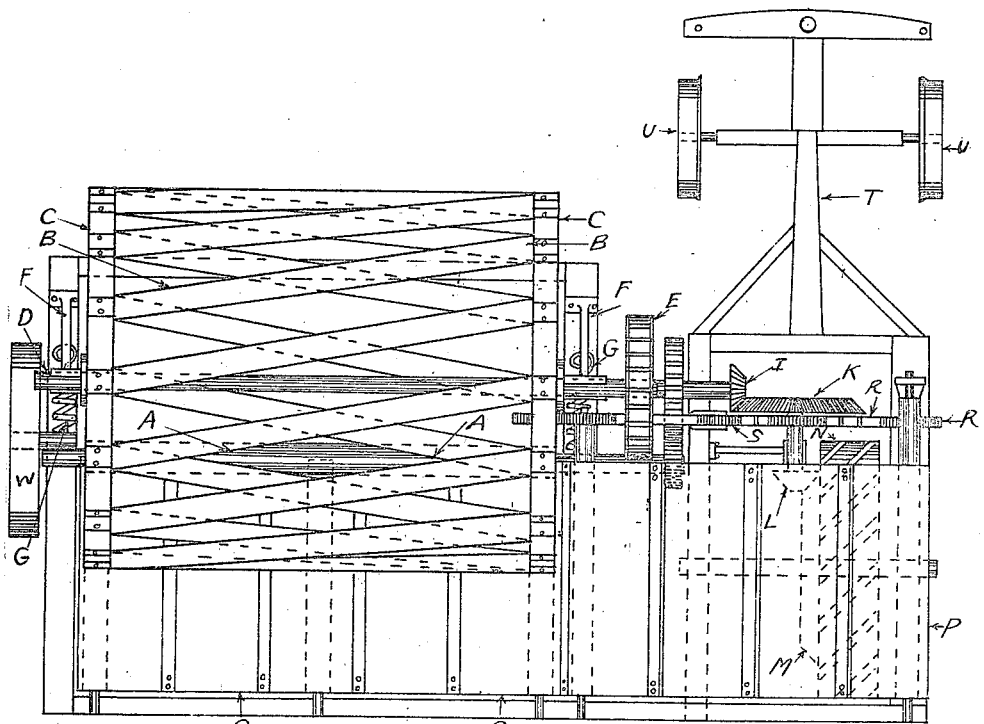
Witnesses  Fig. 1  Inventor
Charles Allan Choate C. A. CHOATE.
MACHINE FOR HARVESTING FLAX.
APPLICATION FILED DEC. 9, 1920.
1,431,372.
Patented Oct. 10, 1922.
2 SHEETS—SHEET 2.
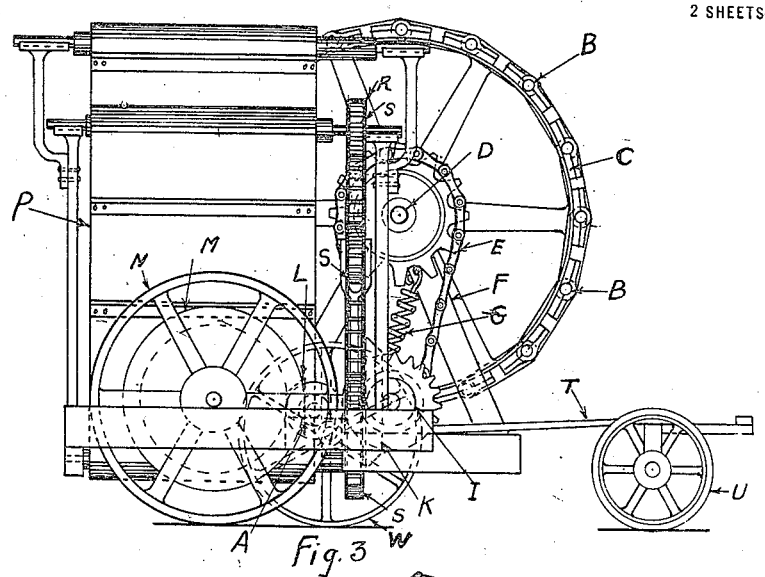
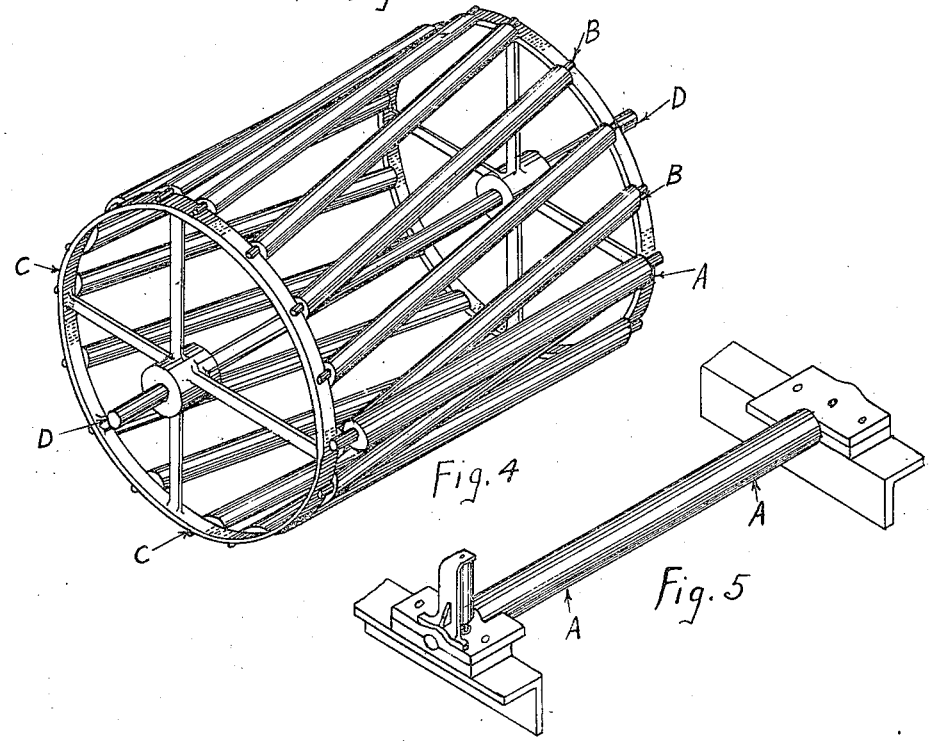
Witnesses
Inventor
Charles Allan Choate Patented Oct. 10, 1922.

1,431,372

UNITED STATES PATENT OFFICE.

CHARLES ALLAN CHOATE, OF CALGARY, ALBERTA, CANADA.

MACHINE FOR HARVESTING FLAX.

Application filed December 9, 1920. Serial No. 429,502.

*To all whom it may concern:*

Be it known that I, CHARLES ALLAN CHOATE, a subject of King George of Great Britain, residing at the city of Calgary, in the Province of Alberta and the Dominion of Canada, have invented a certain new and useful Machine for Harvesting Flax, of which the following is a specification.

My invention relates to a new and useful machine, the objects of which, and the manner of their accomplishment, are apparent from the following specification, reference being had to the accompanying drawings forming an integral part of the application.

Fig. 1 is a plan view looking down from above showing the puller and conveyor devices in relation to one another.

Fig. 2 is a back view showing the conveyor and elevator devices in their relation to the pulling device.

Fig. 3 is a side elevation showing the method of gearing between the travelling wheel, the elevator and the puller.

Fig. 4 is a detail of the puller wheel.

Fig. 5 is a detail of the roller between which and the puller wheel, the flax is held.

Similar characters refer to similar parts throughout the several views.

A rotatably mounted shaft D has rigidly keyed thereon distant from one another two discs or wheels C, the peripheries of which discs or wheels are joined together at intervals by rollers B. The rollers B are free to revolve and are mounted angularly across the intervening space between the discs C, so that one of them is always in contact with a fluted roller A, mounted parallel to the shaft D, which carries the discs C, with the rollers B, mounted therein. The roller A, is provided with springs G to maintain contact with the rollers B and in passing over flax the rollers B act in similar manner to the sails of a reaper, bringing the flax between the two revolving rollers, uprooting it and delivering it to the table canvas Q. The shaft D, is mounted for rotation in brackets F, and has secured thereon a sprocket wheel E connected by a chain to a sprocket wheel mounted upon a counter shaft provided with a gear I, the gear I being driven from a larger bevel gear K, which in turn is geared through a bevel pinion L to a bevel wheel M, secured to the inside of the travelling wheel N.

The flax pulled by the action of the before mentioned machinery is deposited upon an endless table canvas Q, mounted immediately behind the roller A, the canvas being kept in motion conveying the flax to an elevator P which delivers the flax to any suitable place.

Table canvas Q and elevator P are connected by a chain R and suitable sprockets S, so as to take power from the shaft carrying gear K.

The device is mounted upon a suitable frame T, provided with travelling wheels W, N and U, and mechanical or horse draft may be used for operation.

I claim:

1. The combination in a flax harvester of a conveying and elevating device receiving motion from the travelling wheels, and a tension roller mounted in relation to a driven reel, and adjacent to the said conveyor, which reel consists of side pieces with rolling members mounted angularly and joining the said side pieces together, spaces between the said rolling members being adapted to pass the flax and comb it between the tension roller and the bottom of the rolling members of the reel, all substantially as described.

2. In a flax harvester a revolving reel comprising freely mounted rollers forming its periphery, an independent roller mounted in relation to the said reel and always in contact with one or other rollers of the reel to which it imparts a rotating force, a conveying and elevating device in relation to the said reel and roller and means of imparting rotary motion to the said reel and conveying and elevating members, all substantially as described.

3. In a flax harvester a reel consisting of circular distance wheels securely mounted upon a central shaft the peripheries of the said wheels being joined together at intervals by rollers mounted angularly, an independent roller mounted in relation to the said reel periphery members and designed to give tension thereupon, a means of imparting rotary motion to the said reel by the travel of a frame upon which it is mounted, and a conveying and elevating means of delivering flax from the roller-pulling device, all substantially as described.

CHARLES ALLAN CHOATE.

Witnesses:
 HELEN STEEVES,
 G. A. COSTIGAN.